Oct. 11, 1938.  A. P DAVIS  2,133,133
LOG SYSTEM FOR SHIPS
Filed Jan. 6, 1934  3 Sheets-Sheet 1
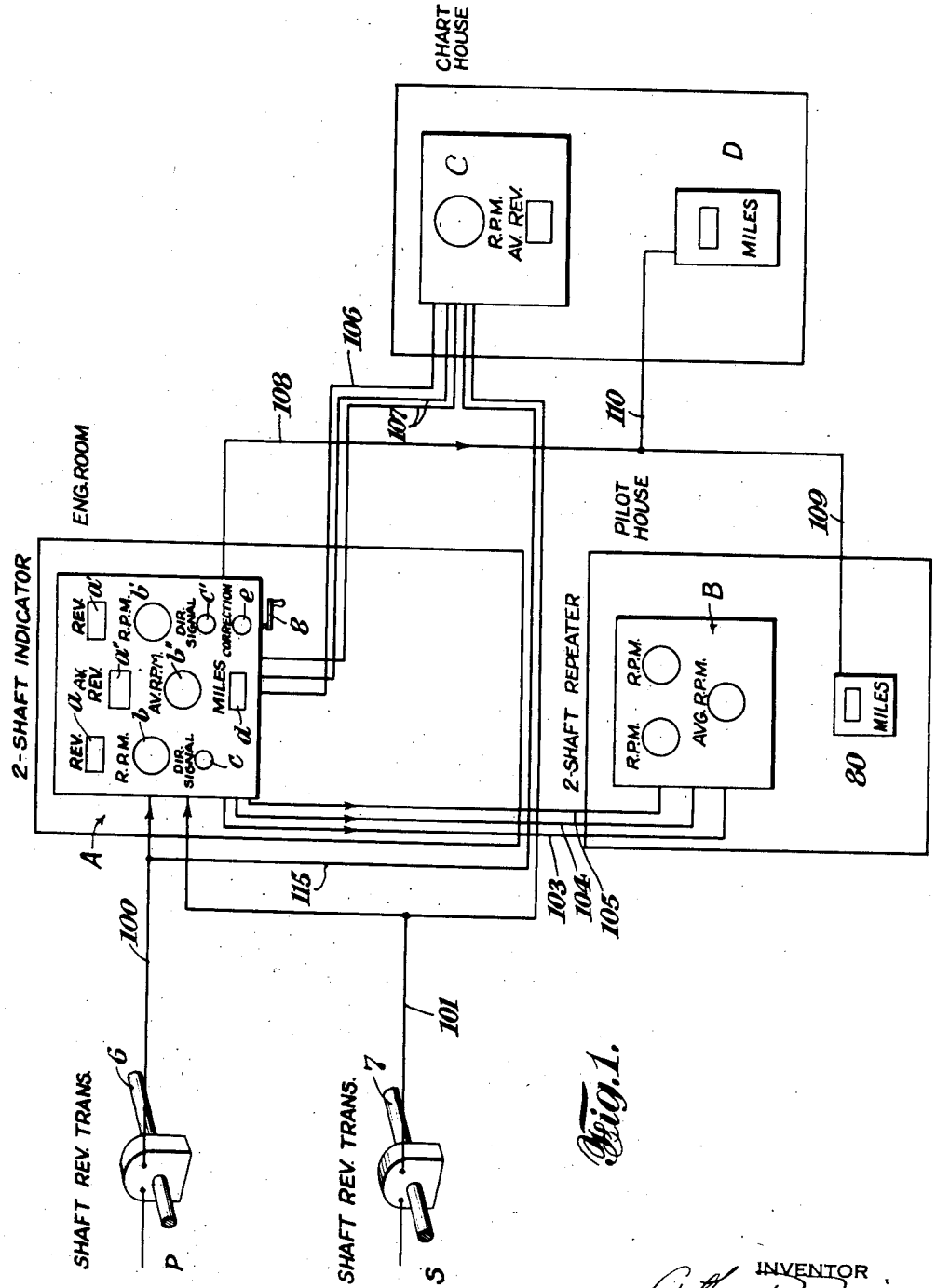

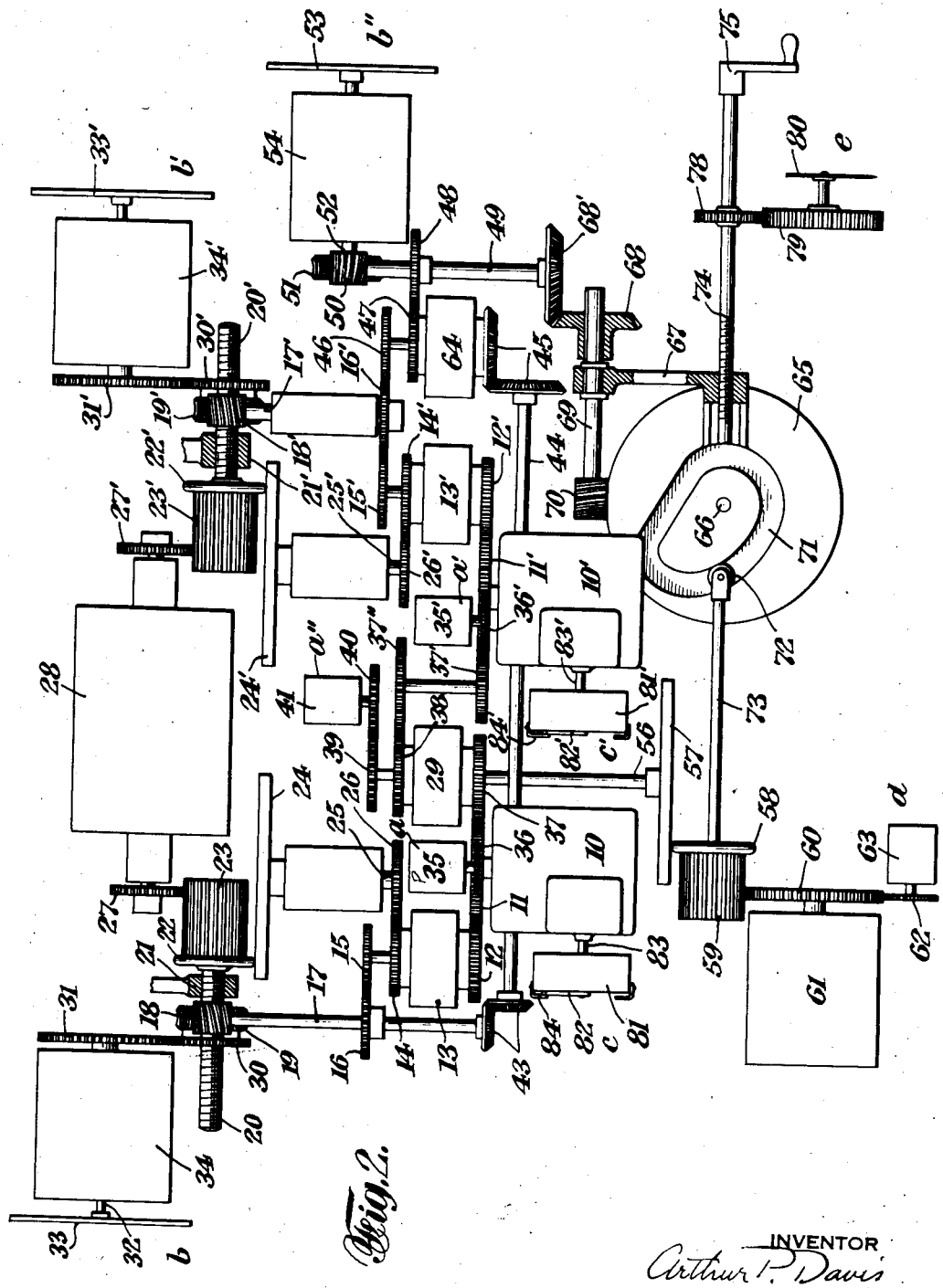

Oct. 11, 1938.                     A. P. DAVIS                     2,133,133
                              LOG SYSTEM FOR SHIPS
                              Filed Jan. 6, 1934            3 Sheets-Sheet 3
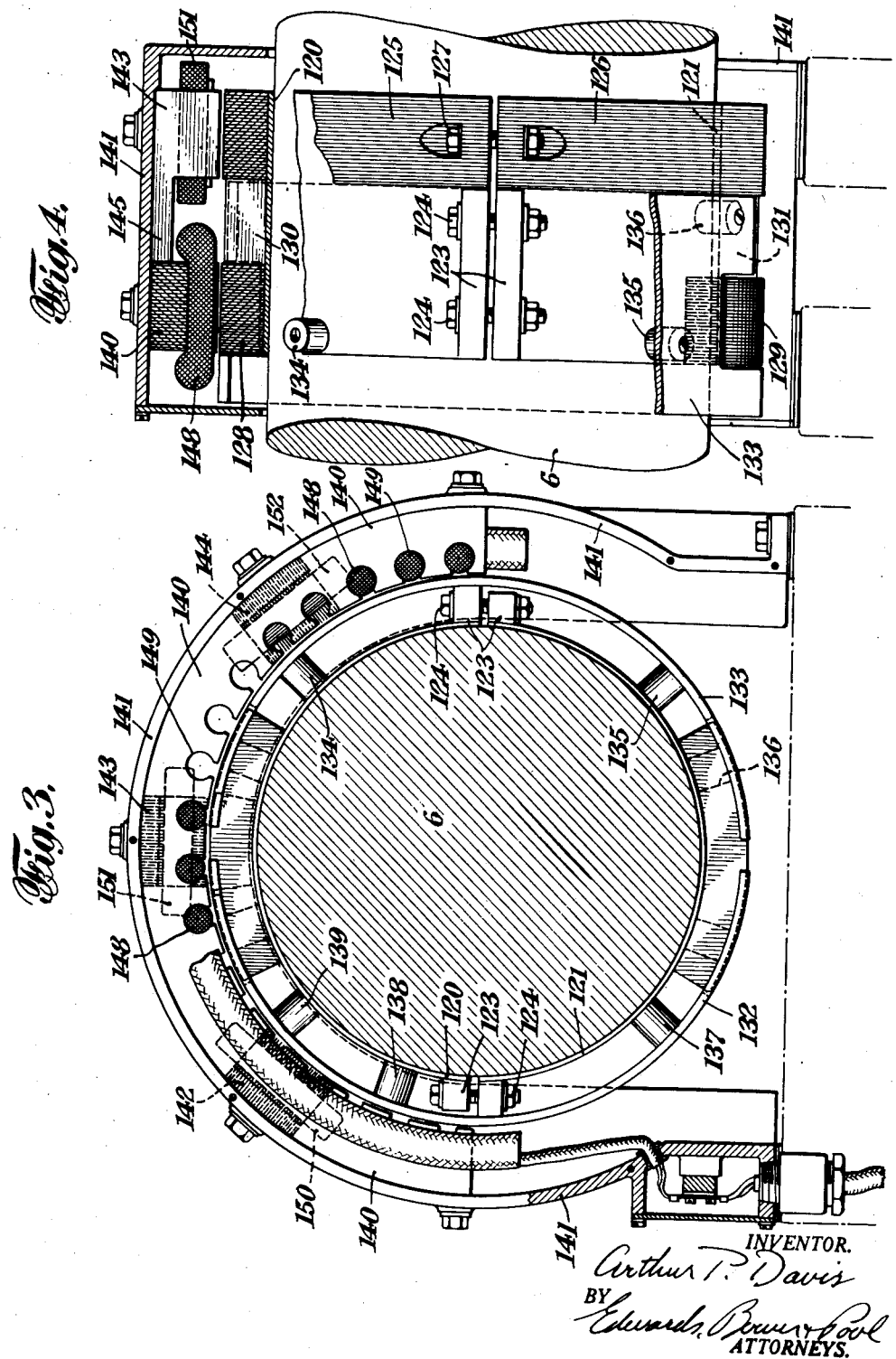
INVENTOR.
Arthur P. Davis
BY
Edwards, Bower & Poole
ATTORNEYS.

Patented Oct. 11, 1938

2,133,133

UNITED STATES PATENT OFFICE 2,133,133

LOG SYSTEM FOR SHIPS

Arthur Pattison Davis, New York, N. Y., assignor to Arma Engineering Co., Inc., Brooklyn, N. Y., a corporation of New York Application January 6, 1934, Serial No. 705,635

3 Claims. (Cl. 235—61)

This invention relates to the navigation of propeller driven vessels, and particularly to the determination and transmission of data as to the speed of the ship and the distance traveled.

The main object of the invention is to provide a system which will count and integrate the revolutions of the ship's propellers and derive therefrom the individual and average propeller shaft revolutions per minute, differentiate revolutions, and compute the total miles traveled by the ship.

Another object of the invention is to provide a system which will transmit the resultant readings to various parts of the ship.

Further objects of the invention, particularly in the details of the apparatus and electrical circuits involved, will appear from the following specification taken in connection with the accompanying drawings, in which Fig. 1 is a diagram illustrating the general aspects of the system by typical elements and connections for one specific embodiment, Fig. 2 is a diagrammatic view illustrating the comparing and computing parts and showing their interrelation, Fig. 3 is a sectional view showing the electrical apparatus applied to the propeller shaft and adapted to transmit the revolution thereof as alternating current of corresponding frequency, and Fig. 4 is a side view with parts in section of the apparatus shown in Fig. 3.

In the system outlined in Fig. 1, alternating currents of frequencies corresponding to the revolutions of each propeller shaft 6 and 7 are transmitted by conductors 100, 101 to the two-shaft indicator A, containing comparing and computing mechanism to derive the readings as shown. At $a$, $a'$ indicators show the total revolutions of the port and starboard propeller shafts and at $b$, $b'$ indicators show the revolutions per minute of each shaft. At $a''$ the average total revolutions of both shafts appear on an indicator, and at $b''$ the indicator shows average R. P. M. of the two shafts. The directions of rotations, forward or reverse, are given at $c$, $c'$ and at the bottom of the board at $d$ an integrating indicator gives the reading of the total mileage. The percent correction of the mileage to compensate for accumulated matter on the bottom and propeller slippage appears at $e$, and is set by handle 8 and from time to time as the obstructive deposits increase and as propeller slippage varies with the R. P. M.

The indicator is located in the engine room and contains most of the calculating and transmitting mechanism.

In addition to the indicators located in the engine room and contained in the two-shaft indicator board A other indicators are placed in desired positions around the vessel to reproduce the readings of the various indicators. Thus conductors 103, 104 and 105 repeat the indications of $b$, $b'$ and $b''$ on the indicator board B located in the pilot house, conductors 106 and 107 repeat indications of $a''$ and $b''$ on the board D in the chart house and conductors 108, 109 and 110 repeat the reading of $d$ on the boards in the pilot house and chart house.

Referring to Fig. 2 showing the mechanism within the two-shaft indicator A the alternating current connection 100 from the port shaft revolution transmitter P drives the port propeller revolution motor 10 and similarly the current carried by conductor 101 from the starboard shaft revolution transmitter drives the starboard propeller revolution motor 10' at the respective speeds of said shafts 6, 7. The port and starboard revolution readings $a$, $a'$ are provided by counters 35, 35' having their gears 36, 36' driven from the gears 11, 11' of motors 10, 10' respectively. And the average revolution reading is given by the counter 41 having its gear 40 driven from the gear 39 of the differential 29, the one side of which is driven through gears 11, 37 from the motor 10, while the other side is driven through gears 11', 37' and 37'' and 38 from the motor 10'. The gearing of the differential 29 is such that the output gear 39 averages the revolutions of the input gears 37, 38.

In order to derive the R. P. M. readings indicated at $b$, $b'$, the gears 11, 11' of motors 10, 10' each drive one side of differenials 13, 13' through gears 12, 12', the other input sides of said differentials 13, 13' being driven from the constant speed motor 28. The rotor of the constant speed motor 28 drives its gears 27, 27' at a predetermined constant rate, these gears being engaged with slide gears 23, 23' carried by the friction rollers 22, 22', which rollers run on the friction discs 24, 24' which through shafts 25, 25' and gears 26, 26' and 14, 14' drive the upper sides of the differentials 13, 13'. The output gears 15, 15' of differentials 13, 13' are driven at a rate which is the difference between the rates of rotation of the gears 26 and 11 for differential 13 and 26' and 11' for differential 13'. The output gear 15, 15' of differential 13, 13' drives the worm 18, 18' through gear 16, 16' and shaft 17, 17', and so drives the worm wheel 19, 19' which meshes with the worm 18, 18'. This worm wheel 19, 19' is threaded on a nonrotatable shaft 20, 20' rotatably carrying the slide gear 23, 23' and friction roller 22, 22', and the rotation of gear 19, 19' moves the shaft 20, 20' lengthwise to vary the position of the friction roller 22, 22' on the friction disc 24, 24' and so vary the speed of the gear 26, 26' with relation to the speed of the time motor gear 27, 27', the relations being such as to always bring the speed of the gear 26, 26' to be the same as that of the gear 11, 11' and so to slow down and finally stop the rotation of the differential output gear 15, 15'.

For every change in speed of the motor 10, 10' there is, therefore, a corresponding change in the speed of the gear 15, 15' followed immediately by a shift of the friction roller 22, 22' to again bring the gear 15, 15' to rest. At each instant the position of the friction roller 22, 22' relative to the center of the friction disc 24, 24' measures the difference in speed between the motor 10, 10' and the time motor 28. The shaft 20, 20' is keyed to slide in the support 21, 21' and the gear 30, 30' is connected to rotate with the worm wheel 19, 19' so that the rotation of the transmitter gear 31, 31' meshing with gear 30, 30' is proportional to the difference in speed between the motor 10, 10' and the motor 28 is a self-synchronous motor driven at constant speed. Consequently the pointer 33, 33' of shaft 32, 32' rotating with gear 31, 31' is moved over a properly calibrated scale to give the indications of the port and starboard propeller R. P. M. on the transmitter dials b, b' of the two-shaft indicator A in the engine room.

To obtain indications of the average R. P. M. the output of the port differential 13 is connected to one side of the differential 64, to the other side of which is connected the output of the starboard differential 13'. The port connections comprise the gear 16, shaft 17, bevel gears 43, shaft 44 and bevel gears 45, while the starboard connections comprise spur gear 16' and 46. The output gear 47 of the differential 64 rotates at the average speed of the input from port and starboard and is meshed to the gear 48 which through worm 50 and worm wheel 51 drives the shaft 52 connected to indicate the average R. P. M. at b'' of the two-shaft indicator A.

The total mileage is derived from the average revolutions as developed by the output gear 39 of the differential 29. This gear 39 drives the shaft 56 carrying the friction disc 57, which is, therefore, rotated at the speed proportionate to the average speed of the two propellers. The mileage, however, is not directly proportional to this average speed but varies with the fouling of the ship's bottom and the relative propeller slip at the different speeds. Characteristics for these two variables are accumulated in the correction cam wheel 65 and its mounting so as to vary the position of the friction roller 57 on the disc 57 and so vary the speed of the slide gear 59 and its meshing gear 60 driving the gear 62 of the mileage counter 63. The correction cam wheel 65 rotating on and about the center 66 has a cam groove 71 in which runs the cam roller 72 of the rod 73 rotatably carrying the friction roller 58. This cam wheel 65 is carried by an adjustable bracket 67 in which is rotatably mounted the shaft 69 of the worm 70. At its other end the shaft 69 is driven by the bevel slide gear 68 meshing with the bevel gear 68' on shaft 49. As the speed of the propeller shafts increases the relative slip will also increase and the gears 68, 68', shaft 69 and worm 70 will turn the worm wheel 65 to move the friction roller 58 inward toward the center of the friction disc 57. In this way a larger number of average revolutions will be required to indicate the same mileage, and this correction is automatically taken care of as the propeller speed changes.

There is also a further increase in slippage when the resistance of the hull is raised by the accumulation of barnacles and other fouling. To provide correction for this accumulated obstruction the frame or bracket 67 carrying with it the cam wheel 65 is threaded to the shaft 74 carrying the hand crank 75. As this crank is turned, clockwise, for instance, the frame or bracket 67 is drawn to the right to move the friction roller 58 toward the center of the disc 57 to increase the slip and maintain the mileage more accurately corresponding to the actual mileage of the ship. This turning of the crank 75 is progressively made upon repeated estimations of the accumulation of the barnacles or other deposit, and when the ship is finally drydocked and cleaned the handle 75 is, of course, turned back to starting position. A gear 78 on the shaft 74 turns a gear 79 carrying the pointer 80 and indicating at e the percent correction being applied for the accumulated deposits on the bottom of the ship.

In order to provide for the transmission of the developed indication of the two-shaft indicator A, the mileage transmitter 61 is provided for the mileage count, the port and starboard R. P. M. transmitters 34, 34' and the average R. P. M. transmitter 54 are provided for the speeds. The R. P. M. transmitters 34, 34' and 54 are of the self synchronous type connected by wires 103, 104 and 105 to the driving means for the indicators of the two-shaft repeater B located in the pilot house. Similarly the mileage transmitter 61 of the self synchronous type (Davis Patent No. 1,977,624) is connected by wire 108 and 109 to the mileage indicator 80 also located in the pilot house (Fig. 1). a branch 110 of wire 108 also transmits the mileage reading to the mileage repeater D of the chart house, and wires 106, 107 carry respectively the average R. P. M. and the average revolutions to the indicator C located in the chart house.

In the two-shaft indicator A the direction signals c, c' are provided by dials 81, 81' and pointers 82, 82', the pointers being loosely connected to shafts 83, 83' and restricted to a limited arcuate movement by stops 84, 84'. On each change of direction the pointers 82, 82' will be moved from one side to the other against the corresponding stop, after which the drive shafts 83, 83' will slip with relation to the pointers. The dials 81, 81' bear legends "Ahead" and "Astern" against which the pointers 82, 82' are read indicating whether the corresponding propeller shafts are turning in such a direction as to drive the ship ahead or astern.

In Figs. 3 and 4 the propeller shaft revolution transmitter is shown in place on the propeller shaft 6. This transmitter induces and controls the output voltages electromagnetically and comprises two semi-circular shells 120, 121 carrying bosses 123 for bolt fastenings 124 tightened to clamp the shells 120, 121 on the shaft as shown. Surrounding these shells at one side are the semi-circular, laminated iron sections 125, 126 clamped around the shaft by the fastening means 127 at adjacent ends of the sections so as to form a complete magnetic ring.

At the other side of shells 120, 121 are the two laminated iron pole pieces 128, 129 clamped to the shaft 180° from each other and magnetically connected to the rings 125, 126 by laminated iron sections 130, 131. The cylindrical periphery of the shaft structure not occupied by the surface areas of the rings 125, 126 and pole pieces 128, 129 is covered by the sections 132, 133 of a copper shield clamped in place on the shaft and maintained in spaced concentric position by the bushing supports 134, 135, 136, 137, 138 and 139. These parts on the shells 120, 121 comprise the rotary part of the transmitter.

Around this is the stator or armature in generally semi-circular form comprising the slotted armature core 140 supported concentric with the propeller shaft by the housing 141 of cast metal. Three laminated iron field cores 142, 143, 144 are carried by the other side of the housing 141 and are magnetically connected to the armature core 140 by extensions 145 on each field core. The armature core 140 and the three field cores 142, 143, 144 are separated from the pole pieces 128, 129 and the ring sections 125, 126 respectively, by an air gap of about one eighth of an inch.

The armature winding 148 is positioned in the eighteen slots 149 of the armature core 140 and is essentially one half of a bisected three-phase four pole Y-connected, two layer, lap winding. The three field coils 150, 151, 152 are wound on the cores 142, 143, 144 respectively and are excited by a 60 cycle alternating current. The circuit for the field flux may be traced from a field coil, as 151, through the field core 143, extensions 145, armature core 140, pole piece 128 or 129, connection 130 or 131, laminated ring 125, 126 and back to the field winding 151. Similar and parallel paths are provided in connection with the field coils 150 and 152.

The field flux in following the path just traced must thread some of the turns of the armature winding and, since the flux is pulsating at the exciting current frequency, a voltage of this frequency will be induced in the turns of the armature winding. Consequently with each pole piece 128, 129 spanning approximately 90 electrical degrees of the armature winding, the magnitude of the induced 60 cycle voltage in any given phase will vary from zero to maximum to zero, will then be displaced in phase by 180° and will again vary from zero to maximum to zero, thus completing the cycle. There are two pole pieces 180° apart forming one half of a four pole distributed winding so that the cycle just described will occur twice for each revolution of the shaft. Since the armature winding has three phases there are at all times three separate 60 cycle voltages induced in it displaced from each other by 120° and each following the cycle above described.

This transmitter is rugged in structure and easily installed without any machining of the shaft. The output of the transmitters provides current in form to drive the self synchronous units and the system provides for the development and indication of the propeller data at any desired point on the ship. Readings are therefore provided giving not only the instant condition of the propellers as relative speeds and directions of rotation, but also the average speed and the totals of the revolutions and the mileage covered by the ship.

The system is simple and inexpensive and easily adaptable to a wide variety of conditions. The various data once determined may be repeated in any part of the ship so that each part has its own most desired information.

I claim:

1. In an indicating system for shafts of ships and the like, the combination with a driver adapted to rotate at a speed corresponding to the speed of one of said shafts, differential mechanism actuated on one input side from said driver, a constant speed motor having adjustable connecting mechanism driving the other input side of said differential, speed indicating means connected to the output side of said differential, and control means between said speed indicating means and the connection between the constant speed motor and the differential acting to control the rate of actuation of said differential by said motor.

2. In an indicating system for shafts of ships and the like, the combination with a plurality of electric motors adapted to continuously rotate at speeds corresponding to the relative speeds of said shafts, of differential means for combining the rotation of said motors to give the average total revolutions of said shafts; rate measuring means including means for combining the rotations of said drivers and acting to give the average speed of rotation of said shafts, indicating means to show the total travel of the ship, and mechanism for driving said indicating means comprising connecting means from said differential means, control means driven from said rate measuring means and acting to vary said drive for said indicating means, and adjusting means independently movable to control said driving mechanism and provide an additional regulation of the indicating means.

3. An indicating system as set forth in claim 2 in which the rate measuring means combining the rotations of the electric motors includes a constant speed motor differentially connected to each of said first mentioned motors.

ARTHUR PATTISON DAVIS.